(12) United States Patent
Guadagna

(10) Patent No.: US 7,669,801 B2
(45) Date of Patent: Mar. 2, 2010

(54) ANIMAL-SCARING DEVICE

(75) Inventor: Robert Guadagna, P.O. Box 610, E. Northport, NY (US) 11731

(73) Assignee: Robert Guadagna, E. Northport, NY (US)

( * ) Notice: Subject to any disclaimer, the term of this patent is extended or adjusted under 35 U.S.C. 154(b) by 0 days.

(21) Appl. No.: 11/257,675

(22) Filed: Oct. 25, 2005

(65) Prior Publication Data

US 2006/0102793 A1     May 18, 2006

(51) Int. Cl.
    *A63H 27/08*     (2006.01)
(52) U.S. Cl. ............................... 244/155 A; 244/153 R
(58) Field of Classification Search ........................ 43/1, 43/2, 3; 116/22 A; 244/153 R, 155 R, 155 A; 242/397
See application file for complete search history.

(56) References Cited

U.S. PATENT DOCUMENTS

| | | |
|---|---|---|
| 72,855 A | 12/1867 | Hughes |
| 743,301 A | 11/1903 | Lischtiak |
| 810,690 A | 1/1906 | Weiss |
| 1,629,442 A | 5/1927 | Geisinger |
| 2,388,478 A | 11/1945 | Garber |
| 2,442,417 A | 6/1948 | Lang |
| 3,110,460 A | 11/1963 | Koonce et al. |
| 3,273,821 A * | 9/1966 | Miller ...................... 242/394.1 |
| 3,358,399 A * | 12/1967 | Waldmann ....................... 43/4 |
| 3,787,998 A | 1/1974 | Kilroy et al. |
| 4,176,807 A | 12/1979 | Kwon |
| 4,228,977 A | 10/1980 | Tanaka |
| 4,669,684 A | 6/1987 | Vernelson et al. |
| D384,598 S | 10/1997 | Park |
| 5,956,880 A | 9/1999 | Sugimoto |
| 6,095,458 A * | 8/2000 | Cripe ...................... 244/153 R |
| 6,241,191 B1 | 6/2001 | Coronado |
| D492,969 S | 7/2004 | Tabor |
| 6,807,765 B2 | 10/2004 | Watermann |
| 2004/0007646 A1 | 1/2004 | Chang |

OTHER PUBLICATIONS

Jensen et al., "Professor Kite and the Secret of Kites", http://www.gombergkites.com/howgen.html: copyright 1987, 1992.

* cited by examiner

*Primary Examiner*—Timothy D Collins
(74) *Attorney, Agent, or Firm*—Dilworth & Barrese, LLP

(57) ABSTRACT

A method of scaring birds and animals includes launching a bird-scaring device in a substantially vertical manner and periodically causing the device to circle in the air in substantially opposite directions.

4 Claims, 2 Drawing Sheets

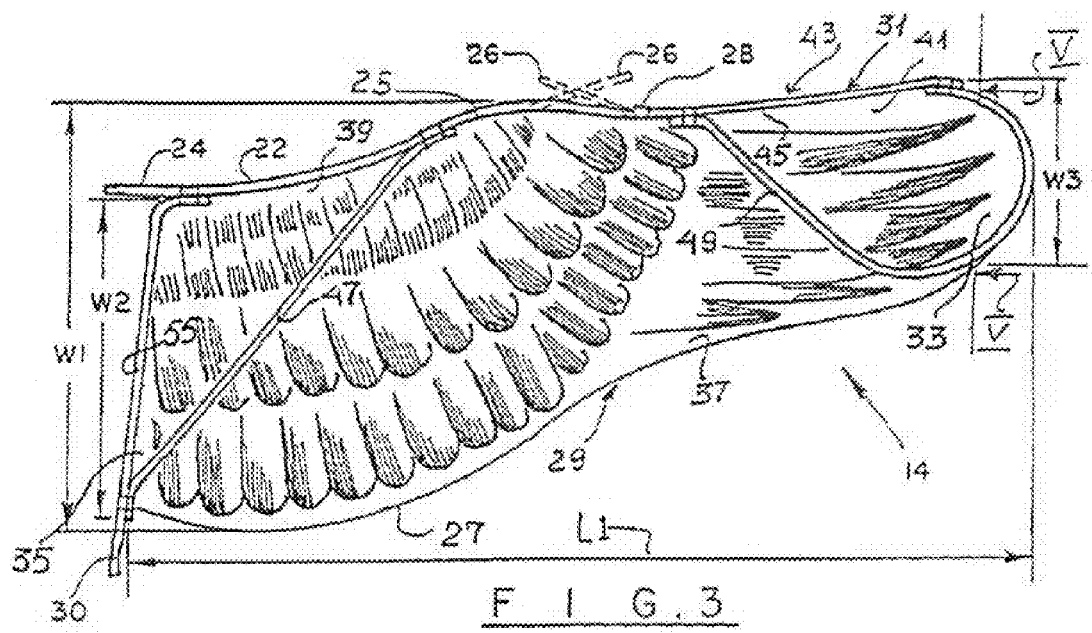
FIG. 3
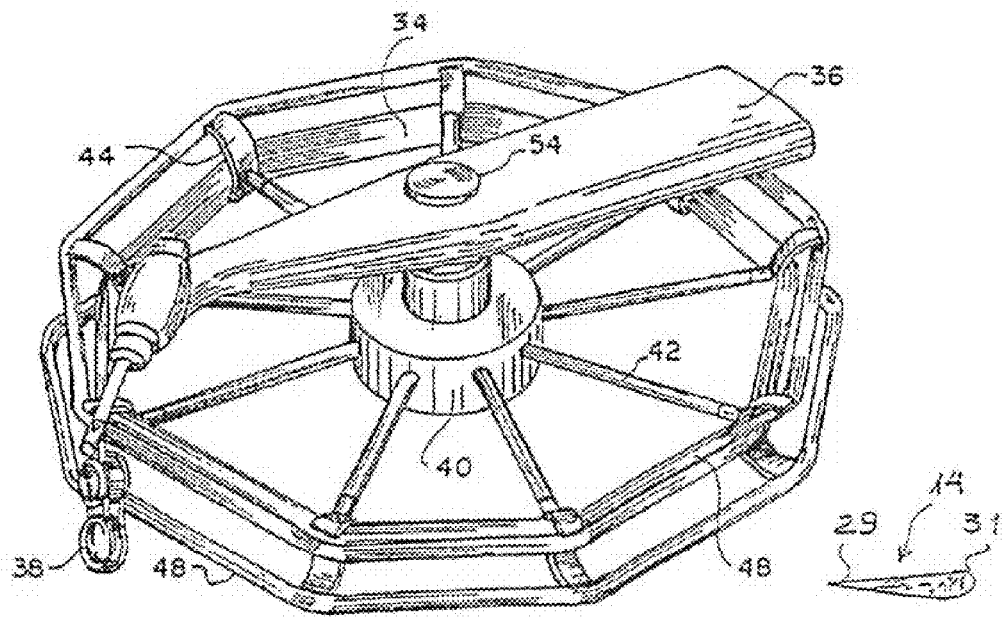
FIG. 4
FIG. 5

ANIMAL-SCARING DEVICE

BACKGROUND OF THE INVENTION

1. Field of the Invention

The present invention relates to an animal-scaring device and to a method of scaring animals.

2. Discussion of Related Prior Art

Small animals, including rodents and birds, are known to pose a serious threat to humans by damaging crops, spreading disease and/or interfering with the normal operation of various facilities such as airports. Among the conventional methods of controlling, i.e., eliminating, bird pests, killing them has been regarded as ineffective. In fact, the United Nations Food and Agriculture Organization has repeatedly cautioned against killing birds, stating that it would not help prevent health-hazard outbreaks. Other pest control methods include the use of traditional scarecrows and optical and sound signal-generating devices, none of which are particularly effective for the protection of large areas such as parks, airports, golf courses, fruit plantations, cornfields, horticultural plots, fields, and the like, from geese, starlets, gulls, herons and other animal pests. It has been observed that the effectiveness of these systems rapidly decreases after installation or implementation since birds soon become accustomed to the stationary silhouettes, shapes and other effects of deterrent devices.

In addition to the afore-discussed conventional methods, it is known to use "hawk kites" to protect areas that attract birds. Typically, to launch such a kite, the user, holding the kite tethered to the hand or to a stationary pole applies a force sufficient to allow the kite to ascend along a relatively smooth trajectory. Maneuverability of this type of kite upon reaching its maximum altitude is often limited. Turning the kite requires that the user possess a relatively high degree of manual dexterity in order to effectively manage the movements of the kite. Furthermore, like other would-be deterrent devices, "hawk kites", while perhaps initially effective, may not provide a long term or permanent bird-scaring effect.

An object of the invention is to provide a bird-scaring device which, due to its unique aerodynamic characteristics, launches from or near ground level in a rapid and substantially vertical ascent.

Still another object of the invention is to provide a bird-scaring device with a strong and simple structure that can be rapidly assembled in the field without the use of tools or specialized devices.

Yet another object of the invention is to provide a bird-scaring device tethered by a control line to a manually manipulated reel.

A still further object of the present invention is to provide a method permitting effective bird scaring in a given location for an indefinitely long period of time.

SUMMARY OF THE INVNETION

In accordance with the invention, the foregoing and other objects are achieved by a bird-scaring device which is configured as a predatory bird kite and is launched from a supporting surface so as to ascend in a substantially vertical manner. Upon reaching the desired altitude, the bird-scaring device is capable of continuously circling about a relatively large area in a manner imitating the circular motion of real avian predators such as hawks, eagles, and the like.

It has been found that use of the bird-scaring device herein not only produces immediate results, i.e., scaring flocks of birds from an area to be protected, but also has a long-term effect on birds and animals keeping them away from the area where the inventive device has been used.

BRIEF DESCRIPTION OF THE DRAWINGS

The features and advantages of the bird-scaring device herein will become more readily apparent from the detailed description of the invention accompanied by the following drawings:

FIG. 3 is a bottom view of a wing of the bird-scaring device of FIG. 1; and FIG. 4 is another perspective view of the reel of FIG. 2.

FIG. 5 is a cross-sectional view of the wing of the bird-scaring device taken along lines V-V in FIG. 3.

DETAILED DESCRIPTION OF THE PREFERRED EMBODIMENT

Figure 1:
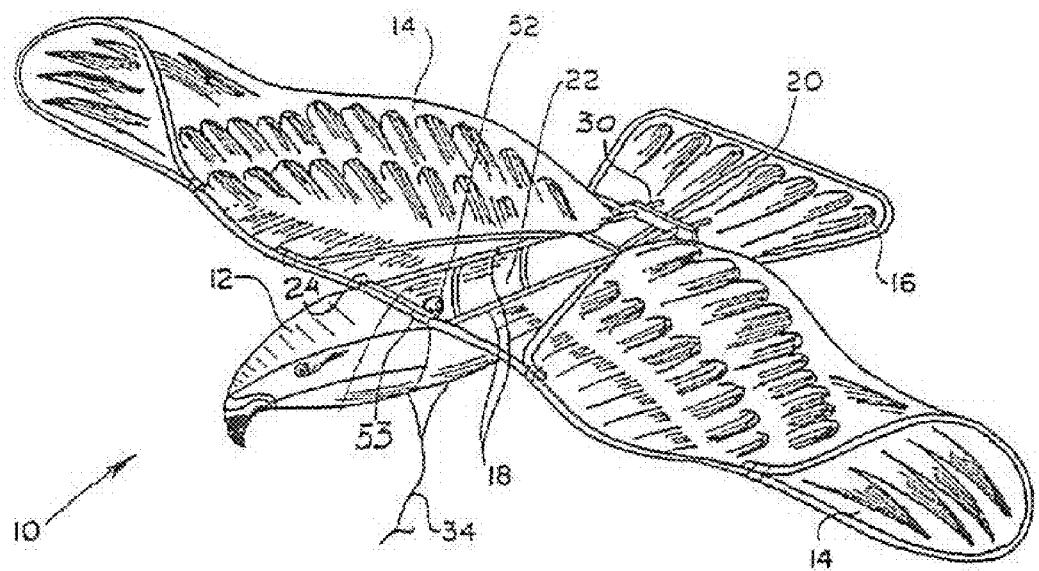
FIG. 1 is a perspective view of a bird-scaring device configured in accordance with the invention.
Figure 2:
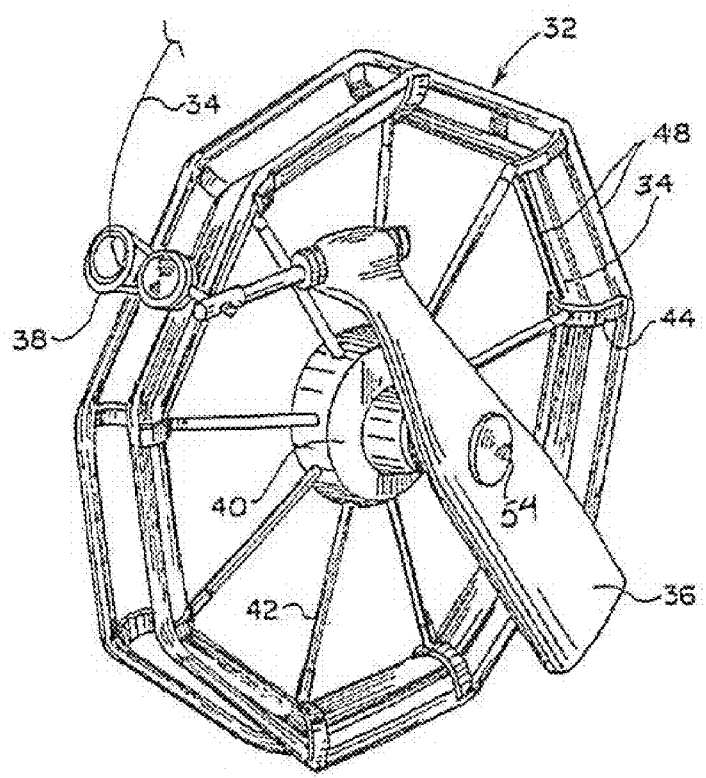
FIG. 2 is an isometric view of a reel configured in accordance with the invention and constituting with the bird-scaring device of FIG. 1 an inventive kit.

Referring to FIGS. 1 through 5, a bird-scaring device configured as a kite 10 is designed to replicate a predatory bird including, but not limited to, hawks, eagles, and the like. The kite 10 is configured with a body 12 (FIG. 1), a pair of wings 14, removably attached to the body 12, and a tail 16 and is capable of popping up into the air in response to a force applied by the user though a control line 34 (FIGS. 1, 2) coupling the device 10 to a manually operated reel 32 (FIGS. 2,4).

The kite 10 is designed to have a three-dimensional, natural looking appearance of a predatory bird. The kite has been trial tested in a variety of locations frequented by small animals, geese, and the like. While the kite 10 has been shown to produce an immediate scaring effect, it has also demonstrated such an effect long-term. It has been observed that after a period of use, birds that were initially scared off have not returned to their favorite sites.

Abrupt, almost vertical take-off of the kite 10 is attributed to several factors including attachment of the line 34 to the head portion of the body 12 which allows the user to apply a pulling force directed upwardly, as well as to certain dimensions of the pair of wings 14. Each of the detachable wings 14 (FIG. 3) is preferably configured to possess a ratio between maximum width $W_1$ and maximum length $L_1$ of about 0.4-0.6. The width $W_1$ corresponds to the greatest width of the wing 14 between its opposite outwardly curved regions 25 and 27 and, preferably, ranges within about a 18-22 inch range, whereas the length L is approximately 39-42 inches. Preferably, the wings 14 each have an airfoil shape characterized by a relatively thick leading edge 31 and a relatively thin trailing edge 29, as shown in FIG. 5. Still another important characteristic of the desired quick ascent capability of the kite includes the ratio between a width $W_3$ of an outer side 33 (FIG. 3) of the wing 14 and a width $W_2$ of the wing's inner side 35 ranging within about a 0.7-1 interval. Dimensional variations providing ratios slightly differing from the afore-disclosed ranges and intervals will generally not adversely affect the unique aerodynamic properties of kite 10 or its performance.

Besides having the outwardly curved region 27 (FIG. 3), the trailing edge 29 of the wing 14 further has an inwardly curved region 37 formed with substantially the same radius of curvature as the region 27. In contrast, the leading edge 31 of the wing 14 is characterized by a pair of inwardly curved regions 39 and 41 which flank the outwardly curved region 25 having the radius of curvature substantially smaller that the radii of the flanking regions 39 and 41. As shown in FIG. 3, the flanking regions 39 and 41 of the leading edge 31 are slightly curved, but the geometry of the wing 14 can be modified so that these regions may be nearly straight.

A variety of materials may be used for manufacturing the wing 14 and include, but are not limited to, nylon, paper, and the like. A frame 43 (FIG. 3) attached to the covering of the wing 14 may be made from a variety of different polymeric materials, wood and even aluminum. The frame 43 may be assembled from separate components including leading sections 22 and 45 and reinforcing section 47 and 49. At least some of these sections are removably secured to one another by displaceable clips 28. For example, as shown in FIG. 3, displacing of the clip 28 releases two end portions 26 of the sections 22 and 45 thereby allowing the user to fold the wing 14 by bringing the inner and outer sides 35 and 33 towards one another. Alternatively, the frame 43 may be molded as a one-piece body.

To assemble the kite 10, an inner end 24 (FIGS. 1 and 3) of the leading section 22 of the frame 43 and a trailing end 30 of an inner section 55 (FIG. 3) of this frame are attached to the body 12. The latter has the tail 16 and the head attached to one another by a hollow frame configured with a pair of spaced elongated sections 18 (FIG. 1) bridged by leading and trailing crossbars 53 and 20. Attachment of the wings 14 to the body 12 is accomplished by inserting the inner end 24 (FIG. 1) of the sections 22 of the wings' frame into an opening formed on the opposite ends of the leading crossbar 53 or vice versa, and further, traversing holes formed in the trailing crossbar 20 by trailing ends 30. Formed on one of the opposite sides of the head is a fastening element 52 (FIG. 1) configured to retain a balloon line (not shown) for operating the kite 10 with a gas filled balloon in windless weather.

The reel 32 (FIGS. 2, 4), configured to launch and control the movements of the kite 10, includes a central hub 40 traversed by a shaft 54 and receiving a plurality of angularly spaced pins 42 which have their free ends 44 supporting a line guiding portion of the reel 32. The free end 44 of each pin 42 is configured with a C-shaped cross-section dimensioned to support spaced sides 48 which prevent the line 34 (FIG. 2) from slipping off the free ends 44. A handle 36 is rotatably fixed to the shaft 54 and has an end provided with a line guide 38.

Pulling the line 34 to apply a force to the kite 10 placed on a stationary support, such as ground, or the like, accomplishes launching the kite 10 so that, during its rise, the kite 10 may deviate from a vertical within about a ±15° range. It has been observed that as the kite 10 deploys, geese quickly vacate the site. Once the kite 10 reaches the desired altitude, it begins to circle in one direction. Rotating the handle 36 (FIGS. 2, 4) of the reel 32 in the counterclockwise direction at an angle not exceeding 360° reverses the direction of the kite's circling.

The bird-scaring device, or kite 10, operated in accordance with the invention, will provide a relatively long-lasting bird-scaring effect with consequent economic benefits for site owners who, otherwise, may need to use such expensive pest scaring methods as the use of specially trained dogs or various types of known and conventional deterrent devices.

While the invention has been disclosed with respect to preferred embodiments, it is not limited to these embodiments, but encompasses any and all embodiments within the scope of the following claims.

What is claimed is:

1. An animal-scaring device comprising a kite configured as a predatory bird and a manually operable reel coupled to the kite by a control line wherein the control line is attached at one end to the ventral side of the body of the bird-configured kite at or near its head portion, there being no attachment of the control line to any other site on the body of the bird-configured kite, wherein the kite contains a reinforcing section possessing a first portion defining the outer side of the wing, a second portion spanning the width of the wing and terminating in a third portion attached to the leading edge of the wing.

2. A process for scaring birds from an area to be protected comprising circling an area to be protected continuously with the animal scaring device of claim 1.

3. The animal-scaring device of claim 1, wherein the reel has a hub and a plurality of spaced pins extending radially outwardly from the hub and each having a C-shaped free end.

4. The animal-scaring device of claim 3, wherein the reel further has two spaced endless sides supported by the free end of the plurality of pins so that a central portion of the free end of each of the plurality of pins supports the line, the spaced endless sides being spaced radially outwards from the central portion of the free end to prevent the line from slipping off the reel.

* * * * *